United States Patent
Nos et al.

(10) Patent No.: US 9,912,604 B2
(45) Date of Patent: Mar. 6, 2018

(54) REDUCTION OF SILICON AREA FOR ETHERNET PFC PROTOCOL IMPLEMENTATION IN QUEUE BASED NETWORK PROCESSORS

(71) Applicant: Freescale Semiconductor Inc., Austin, TX (US)

(72) Inventors: Roman Nos, Petach Tikva (IL); Noam Efrati, Beer Sheva (IL); Sagi Gurfinkel, Kfar Warburg (IL)

(73) Assignee: NXP USA, Inc., Austin, TX (US)

( * ) Notice: Subject to any disclaimer, the term of this patent is extended or adjusted under 35 U.S.C. 154(b) by 55 days.

(21) Appl. No.: 14/811,900

(22) Filed: Jul. 29, 2015

(65) Prior Publication Data

US 2017/0034069 A1  Feb. 2, 2017

(51) Int. Cl.
| | | |
|---|---|---|
| *H04L 12/863* | (2013.01) | |
| *H04L 12/721* | (2013.01) | |
| *H04L 29/12* | (2006.01) | |

(52) U.S. Cl.
CPC .......... *H04L 47/6215* (2013.01); *H04L 45/38* (2013.01); *H04L 45/66* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 2010/0303075 A1 | 12/2010 | Tripathi et al. | |
| 2013/0058208 A1* | 3/2013 | Pfaff .................... | H04L 12/4633 370/217 |
| 2014/0036681 A1* | 2/2014 | Kamerkar ........... | H04L 12/2697 370/235 |

\* cited by examiner

*Primary Examiner* — Paul H Masur
*Assistant Examiner* — Michael Phillips (57) ABSTRACT

In a pipelined network processor, a first stage in the pipeline is responsive to receipt of a pause indication from a third stage. The pause indication is associated with one of a plurality of ports and priority classes of frames advancing through the pipeline. The first stage asserts a hold indication to a second stage in response to the pause indication. The second stage is responsive to the hold indication by marking frames associated with the one of a plurality of ports and priority classes as they arrive from the pipeline at the second stage by returning them to the first stage interface instead of transmitting them to the third stage. The marked frames are stored in memory external to the network processor.

20 Claims, 8 Drawing Sheets

PFC FLOW

FIG. 4

NTI

PAUSE FSM

FIG. 8

REDUCTION OF SILICON AREA FOR ETHERNET PFC PROTOCOL IMPLEMENTATION IN QUEUE BASED NETWORK PROCESSORS

FIELD

This disclosure relates generally to priority based flow controlled networks, and more specifically to transmitting frames therein.

BACKGROUND

Priority based flow control is part of a set of standards that have been targeted for employment in data center environments. The purpose of these standards is to enable lossless semantics for a subset of layer 2 flows carried on an Ethernet segment. Accordingly, a receiver can generate a media access control frame and send a PAUSE request to a sender when it predicts the potential for a buffer overflow. Upon receiving a PAUSE frame, the sender responds by stopping transmission of any new packets until the receiver is ready to accept them again. One such standard is IEEE 802.1Qbb PFC, which extends the basic PAUSE semantics to multiple traffic classes per Ethernet segment. This enables applications that require flow control to coexist on the same wire with applications that perform better without it. Specifically, the priority based flow control pause frame mechanism defines 8 priorities that can be set to a pause state individually and independently of the other priorities. In queue based pipeline network processors, where all priority queues are staged through a single multi-level pipeline, difficulties can arise when pausing one priority queue without pausing the entire pipeline.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of systems and methods described herein provide for the transmission of priority flow controlled frames through a pipelined network processor. In a system employing priority flow control, the network processor must be able to stop any given priority flow from being transmitted to the network within a specified period of time after receipt of a corresponding flow control signal. This period of time depends on the type of flow control being employed. When multiple priority flows must be handled by a network processor employing a single processing pipeline, a way must be provided to stop the transmission of frames of a paused priority flow after its flow control signal is asserted without stopping the other flows whose signals are not asserted. Because the pipeline may include many stages, the network frames associated with the priority flow may already be under way through the pipeline by the time the flow control signal is received at the head of the pipeline. Herein described are embodiments of systems and methods for the transmission of priority flow controlled frames through a pipelined network processor in which a memory is employed external to the network processor for storing priority flow control frames that are currently advancing through the network processor pipeline after the corresponding flow control signal is asserted. This ensures that the transmission of priority flow controlled frames is ceased within the allowable time from when its flow control signal is asserted. Furthermore, employing external memory advantageously saves silicon area, power, and increases overall speed.

Figure 1:
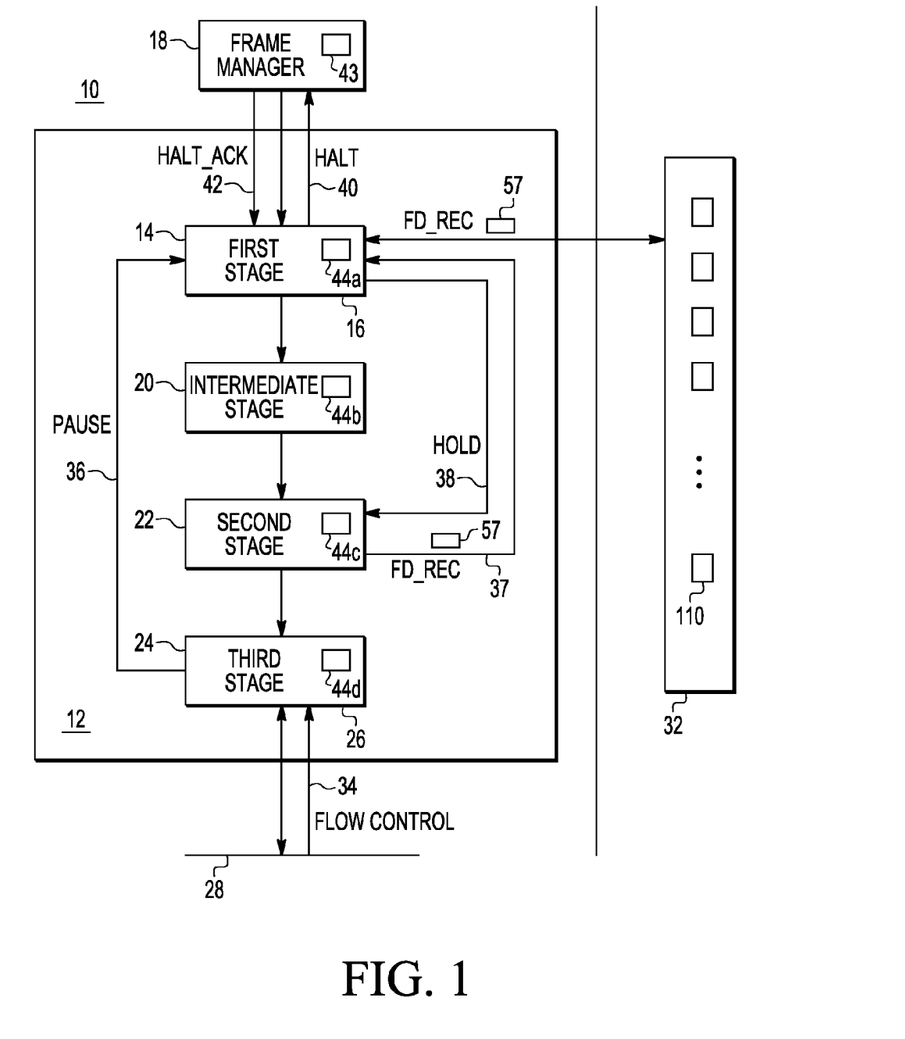
FIG. 1 is a block diagram of an embodiment of a pipelined network processor employing priority flow control and external memory for storing marked paused frames.

FIG. 1 shows an embodiment of a generalized pipelined network processor 10. A pipeline 12 includes several stages, the nature of which depends upon the application. In the illustrated example of pipelined network processor 10, the pipeline includes a first stage 14 that is shown at the head 16 of the pipeline 12, coupled to a frame manager 18. An intermediate stage 20 is shown coupled between the first stage 14 and a second stage 22. A third stage 24 at the foot 26 of the pipeline 12 is coupled between the second stage and a network 28 over which network packets are transmitted and received. The frame manager 18 sends frames 43 into the pipeline 12. Frames 44a, 44b, 44c, and 44d (collectively 44) are illustrated as advancing between the various stages of the pipeline 12. As frame 44a is processed at first stage 14, frame 44b is processed at stage 20, frame 44c is processed at stage 22, and frame 44d is processed at third stage 24. This is one example of pipeline stages in a generalized pipelined network processor. Embodiments of the present invention are not limited to the number or nature of pipeline stages, except as specifically stated below.

In a system that implements priority based flow control (PFC) (e.g., using the IEEE 802.1Qbb standard), a transmitter (e.g. a transmitter residing in the third stage 24 in FIG. 1) is expected to stop transmitting new frames associated with the paused priority flow within a certain timeframe from when a flow control indication received from the network and associated with the traffic flow is asserted. The transmitter should do this in order that frame buffers at a receiver on the network 28 do not overflow due to excess unexpected packets that should not have been sent after the flow control signal was asserted by the receiver to the transmitter. In a pipelined system such as that of FIG. 1, one or more network ports may be moving multiple traffic flows through the same transmit pipeline, and that pipeline may be arbitrarily deep. A decision to stop transmitting frames for a particular port and priority class is often taken by frame managing hardware such as frame manager 18, which is ahead of the pipeline 12. However, by the time the frame manager 18 makes this decision, there may already be priority frames in the first, intermediate, second, and third stages 14, 20, 22, and 24 that will still be transmitted. Transmission of frames may therefore be stopped too late, thus causing a PFC timing violation. A previous implementation involves storing the paused frames in per port and priority class FIFOs at the end of the pipeline (e.g. between the second stage 22 and the third stage 24), which requires significant expensive silicon area in the network processor 10.

Figure 2:
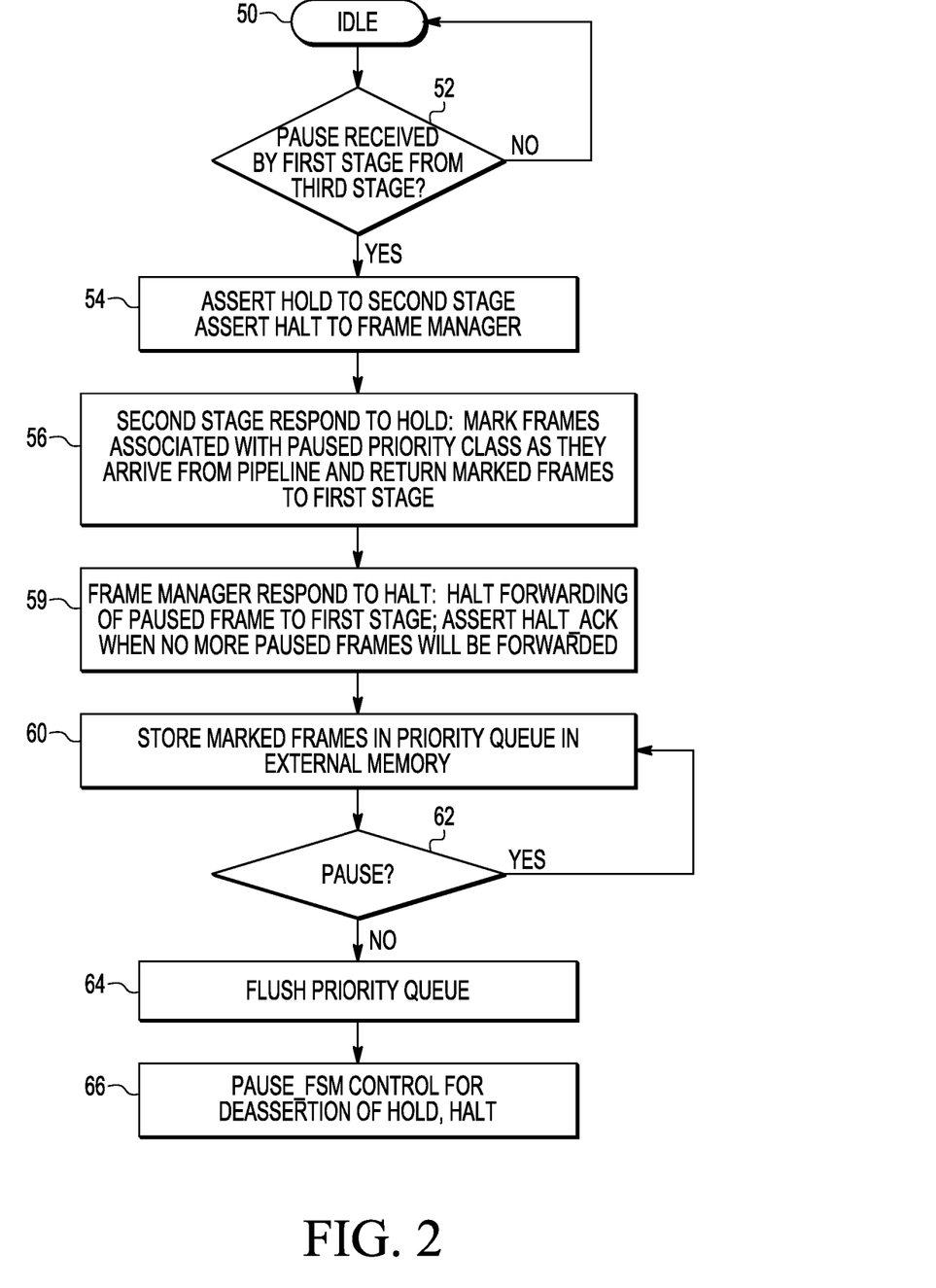
FIG. 2 is a high level flow diagram of the process by which the embodiment of FIG. 1 operates to store marked paused frames in external memory.

The solution is shown in the embodiment of FIG. 1 and in the flow diagram of FIG. 2. A memory 32 is located external to the silicon area of the network processor 10 and may be, for example, DDR SDRAM or the like. This external memory is used to store the frames 44 associated with the paused port and priority class that are advancing through the various stages in the pipeline 12 between the frame manager 18 and the second stage 22 when a flow control signal 34 is received at the third stage 24 from the network 28. This eliminates using internal FIFOs or separate pipelines to store paused frames. This, in turn, improves performance by improving speed, reducing power, reducing silicon area required by the network processor 10, and thereby improving its reliability.

In the embodiment of FIG. 1 there is shown a flow control indication 34 received by the third stage 24 of the pipeline 12 from the network 28. Upon reception of this flow control indication 34, which in embodiments may be a flow control frame, the third stage generates a pause indication 36 to the first stage 14. The first stage 14 is responsive to the pause indication 36 to handle two issues: 1) inhibit the second stage 22 from sending any frames currently in the pipeline 12 and associated with the paused port and priority class to the third stage 24, and instead return those frames to the first stage 14 for storage in the external memory 32 via a recycle path 37, and 2) inhibit the frame manager 18 from pushing frames 43 associated with the paused port and priority class to the first stage 14 to assure that no further paused frames on hold enter the pipeline 12 while the priority class is paused. The first stage 14 accomplishes this through communication with the frame manager 18 and second stage 22 using the signaling shown in FIG. 1. This signaling includes a hold indication 38 coupled between the first stage 14 and the second stage 22 and a halt indication 40 coupled between the first stage 14 and frame manager 18. A halt_ack indication 42 is also coupled from the frame manager 18 to the first stage 14.

In FIG. 2 a high level process of operation is shown, with reference to the elements of FIG. 1. This process is duplicated for each port and priority class, and any port and priority class can be in any state of pause/unpause at any given time. At idle state, no pause condition is present (at 50). In response to receiving a pause indication 36 (at 52) from the third stage 24 (at 52), the first stage 14 asserts a hold indication 38 to the second stage 22, and asserts a halt indication 40 to the frame manager 18 (at 54). The second stage 22 responds to the hold indication 38 by marking frames associated with the paused port and priority class as they arrive from the pipeline 12 and returns the marked frames 57 (FIG. 1) to the first stage 14 (at 56) via a recycle path 37. The frame manager 18 responds to the halt indication 40 by halting the forwarding of paused frames from the frame manager 18 to the first stage 14 and asserting the halt_ack indication 42 when no more paused frames will be forwarded (at 59). The marked frames 57 forwarded from the second stage 22 are stored in priority queues 110 in external memory (at 60). When the pause indication 36 is deasserted (at 62), the priority queue 110 in the external memory 32 may begin flushing (at 64). A pause state machine 70 (explained below) controls the deassertion of the halt_ack indication 42 and hold indication 38 (at 66). It is noted that the steps shown herein do not necessarily occur in the order listed and the processes run simultaneously as will be further understood with regard to the descriptions of the separate processes below.

Figure 3:
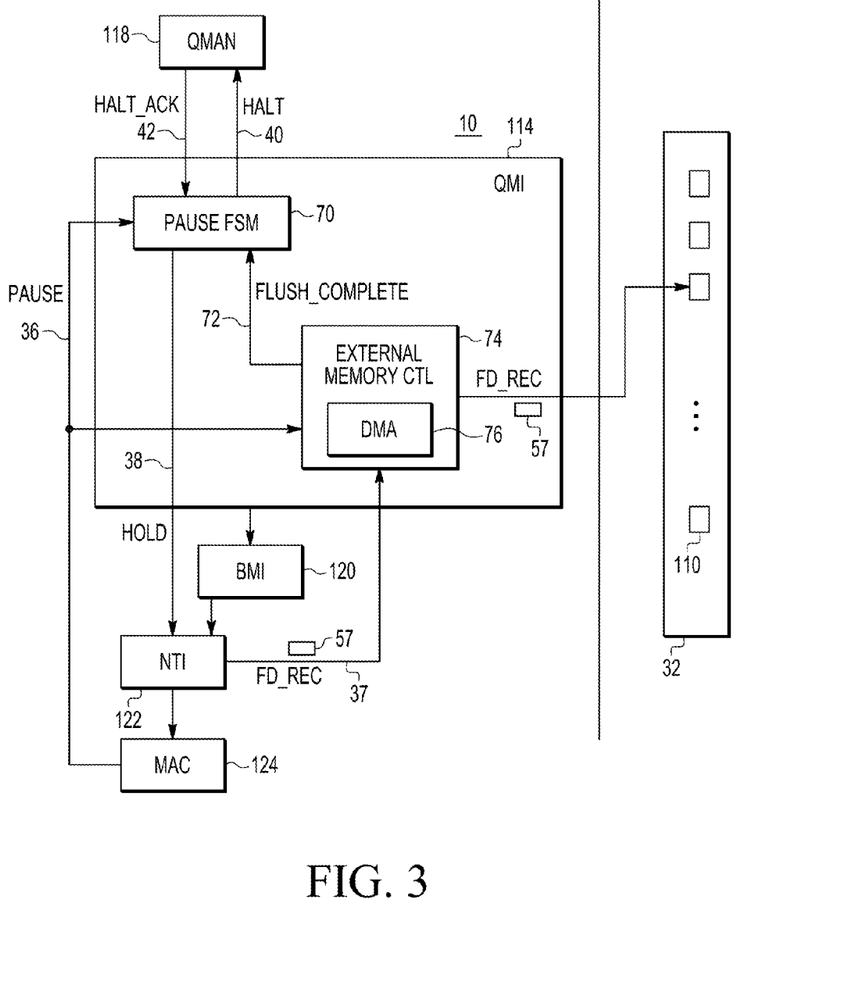
FIG. 3 is another embodiment of a pipelined network processor employing priority flow control and external memory for storing marked paused frames.

In FIG. 3 there is shown an embodiment of the network processor 10 and external memory 32 of FIG. 1. The frame manager 18 is embodied as a queue manager (QMAN 118) that pushes frames 44 (FIG. 1) to the first stage 14, which is embodied as a queue manager interface (QMI 114). The QMI 114 includes a pause functional state machine (PAUSE FSM) 70 that accepts as input the pause indication 36 shown as PAUSE 36, the halt_ack indication 42 shown as HALT_ACK 42, and a FLUSH_COMPLETE signal 72 from an external memory controller 74. The PAUSE FSM 70 produces as output the hold indication 38 shown as HOLD 38 and the halt indication 40 shown as HALT 40. The external memory controller 74 includes a DMA controller 76. The QMI 114 is coupled to the intermediate stage 20, which is embodied as a buffer management interface (BMI) 120. The BMI 120 is coupled to the second stage 22 which is embodied as a network transmit interface (NTI) 122, which accepts as an input the HOLD indication from the QMI 114 and produces as an output marked frames 57 on the recycle path 37 back to the QMI 114 via recycle path 37. The NTI 122 is coupled in turn to the third stage 24, embodied as a media access control stage (MAC 124), which produces the PAUSE signal 36 in response to the flow control indication 34 received from the network 28 (FIG. 1)

Figure 4:
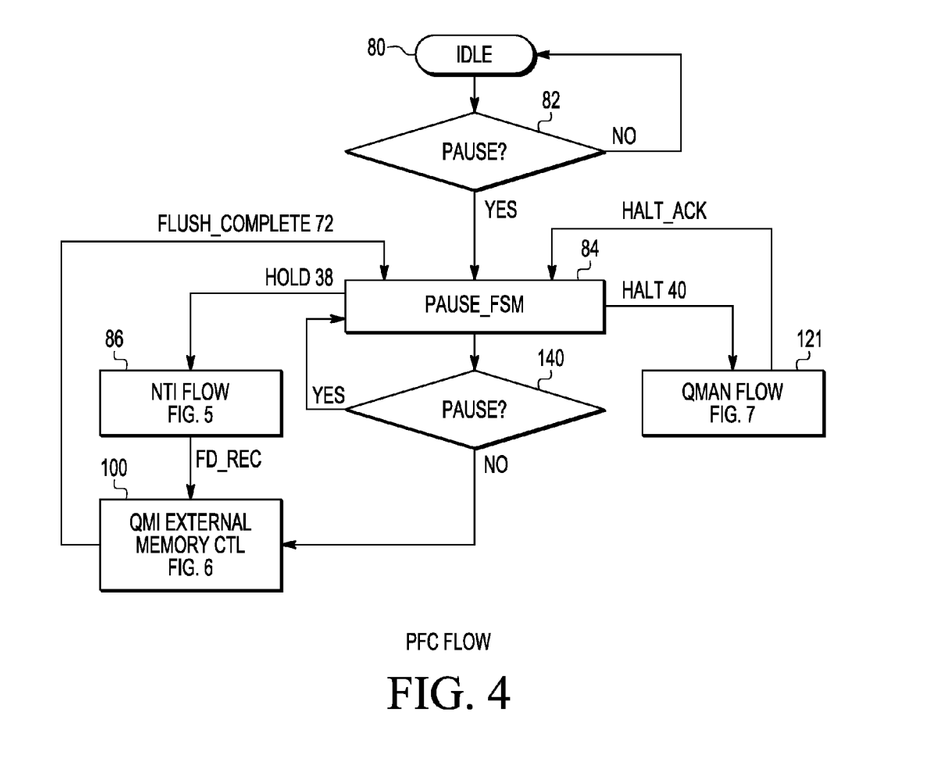
FIG. 4 is a flow diagram of the process by which the embodiment of FIG. 3 operates to store marked paused frames in external memory.
Figure 5:
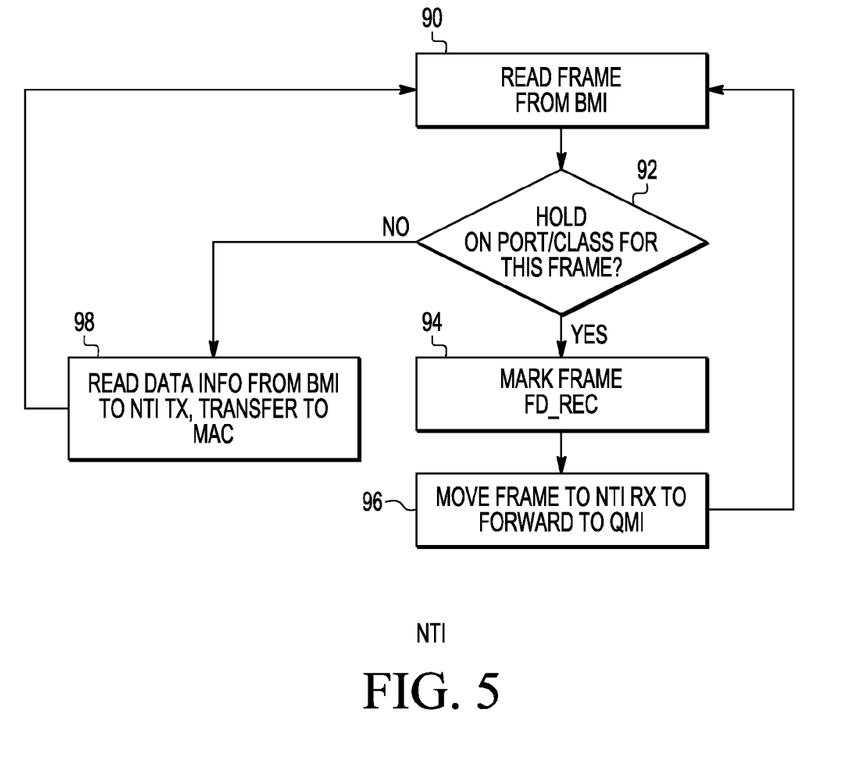
FIG. 5 is a flow diagram of the network transfer interface (NTI) flow 86 of FIG. 4.

The interactions between the PAUSE FSM 70 and the various flows for the QMAN 118, QMI 114, NTI 122, and external memory 32 are shown in another representation of a PFC flow diagram in FIG. 4. The detailed flows for the NTI 122 flow, the QMI memory controller 74, the QMAN 118 flow, and the PAUSE FSM 70 are shown in FIGS. 5 through 8 respectively. In FIG. 4, when the PAUSE indication 36 is deasserted, the flow is in an idle state 80. When the PAUSE indication 36 is asserted (at 82), the PAUSE FSM 70 asserts the HOLD indication 38 to the NTI 122 and asserts the HALT indication 40 to the QMAN 118, (at 84). NTI PFC flow (FIG. 4, at 86) is shown in FIG. 5.

Referring to FIG. 3 and FIG. 5, The NTI 122 reads frames from the BMI 120 (at 90). A frame, in the present embodiment, is implemented as a frame descriptor (FD). An FD is a data structure that describes one or more network data buffers that contain network data to be transferred. Each frame is associated with a PFC priority. If HOLD 38 is asserted for the port and priority class associated with the current frame being read (at 92), the frame is marked, for example with a FD_REC flag (at 94), and moved to the NTI 122 receive port to be forwarded via the recycle path 37 to the QMI 114 (at 96) (shown in FIG. 3 as marked frame 57 "FD_REC" on recycle path 37). The next frame is then read from the BMI 120 (at 90). If HOLD 38 is not asserted for the port and class associated with the current frame being read (at 92), data is read from the BMI 120 and the frame and data are sent to the NTI 122 transmit port to transfer to the MAC 124. The next frame is then read from the BMI 120.

Referring back to FIG. 4, the FD_REC frames 57 are shown forwarded to the QMI memory controller 74 (at 100). The QMI memory controller 74 flow is described in FIG. 6. When no marked frames 57 are being received the controller is idle (at 102). When a marked frame 57 is received (at 104), then it is sent to DMA 76 for transfer to one of the priority queues 110 in the external memory 32 corresponding to the port and priority class of the marked frame (at 106).

Figure 6:
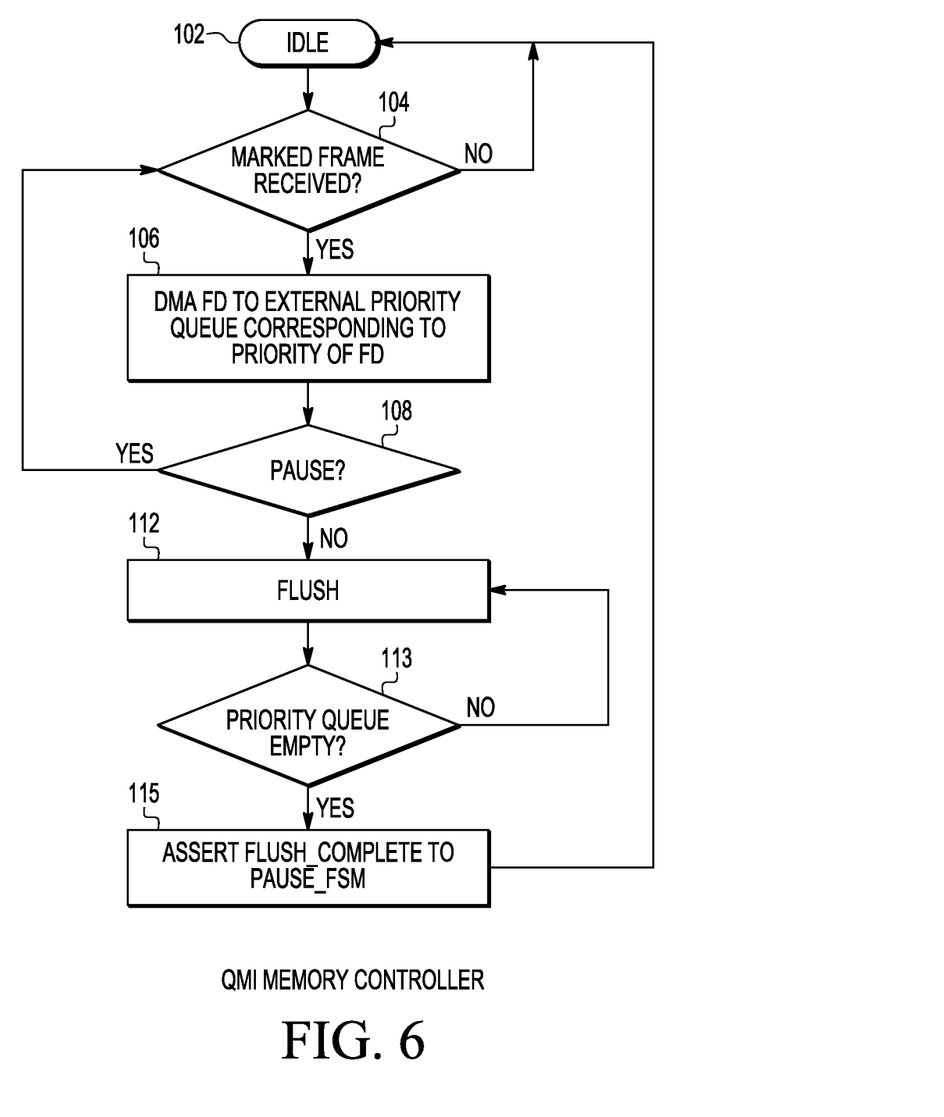
FIG. 6 is a flow diagram of the operation of the queue manager interface (QMI) memory controller flow 100 of FIG. 4.

Generally, each priority queue should be large enough to accommodate for the maximum possible pipeline depth—in this case, QMAN+QMI+BMI+NTI. It is noted that, although in the embodiment described the frames stored in external memory are frame descriptors, the frames stored could include more information, such as further metadata or network frame data. In such cases, further external memory should be allocated.

The DMA of marked frames 57 continues until a corresponding PAUSE indication 36 is deasserted (108). Now the priority queue 110 can be flushed from external memory back to the pipeline (at 112). DMA is used to read the priority queue in external memory 32 to transfer the FDs back to the pipeline 12. When the queue is empty (at 113), a FLUSH_COMPLETE indication 72 is sent to the PAUSE FSM 70 (at 115).

Figure 7:
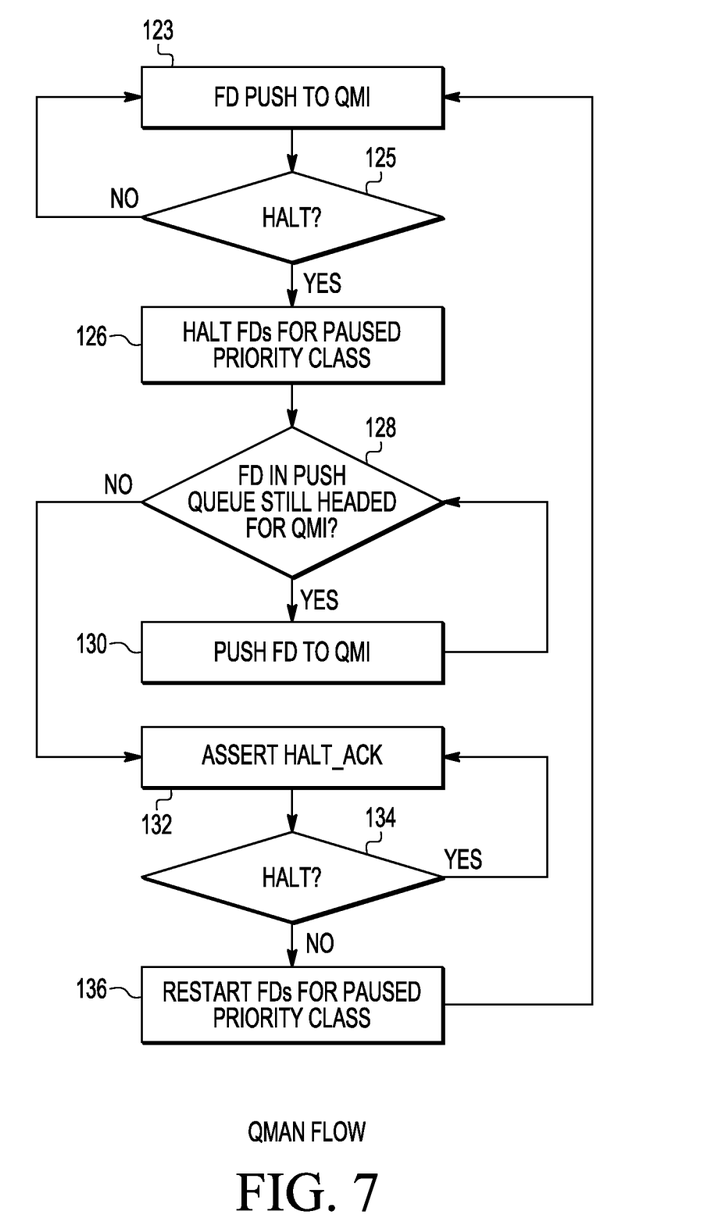
FIG. 7 is a flow diagram of the operation of the queue manager (QMAN) flow 121 of FIG. 4.

Referring back to FIG. 4, the QMAN 118 responds to the HALT indication 40 (at 121). The QMAN PFC flow is shown in FIG. 7. The QMAN 118 has its own pipeline, or FD queue, from which frames, or FDs, are pushed to the QMI 114. When a HALT indication 40 is received by the QMAN 118, an FD may have proceeded too far through the QMAN pipeline to prevent the frame from making it to the QMI 114 pipeline. This is the reason for the HALT_ACK indication 42 from the QMAN 118 to the QMI 114.

Accordingly, referring to FIG. 7, the QMAN 118 pushes an FD 43 (FIG. 1) to the QMI 114 from its FD queue (at 123), and continues to do so until an HALT indication is received (at 125). In response to the receipt of the HALT indication 40, the QMAN 118 halts forwarding of further FDs for the port and class associated with the paused frame (at 126). The QMAN 118 then checks to see if an FD in the current QMAN 118 push queue is associated with the paused priority class (at 128). If so, the FD push is allowed to continue (at 128) until no more FDs associated with the paused priority class are present in the QMAN 118 FD push queue (at 130). When the FD push queue is clear of paused FDs, the QMAN 118 asserts the HALT_ACK indication to the QMI (at 132). The QMAN 118 then waits for the deassertion of the HALT indication from the QMI 114 (at 134), at which point the QMAN 118 restarts pushing FD's for the now unpaused priority class (at 136).

Referring back to FIG. 3 and FIG. 4, the PAUSE FSM 70 (at 84) controls the timing of the HOLD indication 38 and HALT indication 40 to assure frame ordering. The QMI 114 needs to ensure that, when pausing and un-pausing PFC frames flowing between the QMAN 118, the external memory 32 priority queues 110, and the pipeline 12, that frame order be maintained. This is particularly important during flushing of external memory 32 priority queue 110 frames as the PAUSE indication 36 is asserted, deasserted, and reasserted. For instance, when the QMI 114 detects that the PAUSE indication 36 has been deasserted (FIG. 4, at 140), it should be assured that the priority queue 110 in the external memory is flushed before deasserting the HOLD indication 38 to the NTI 122. Also, the QMI 114 should ensure that the corresponding external memory 32 priority queue 110 is flushed fully before reactivating the QMAN 118 priority frames 43.

Figure 8:
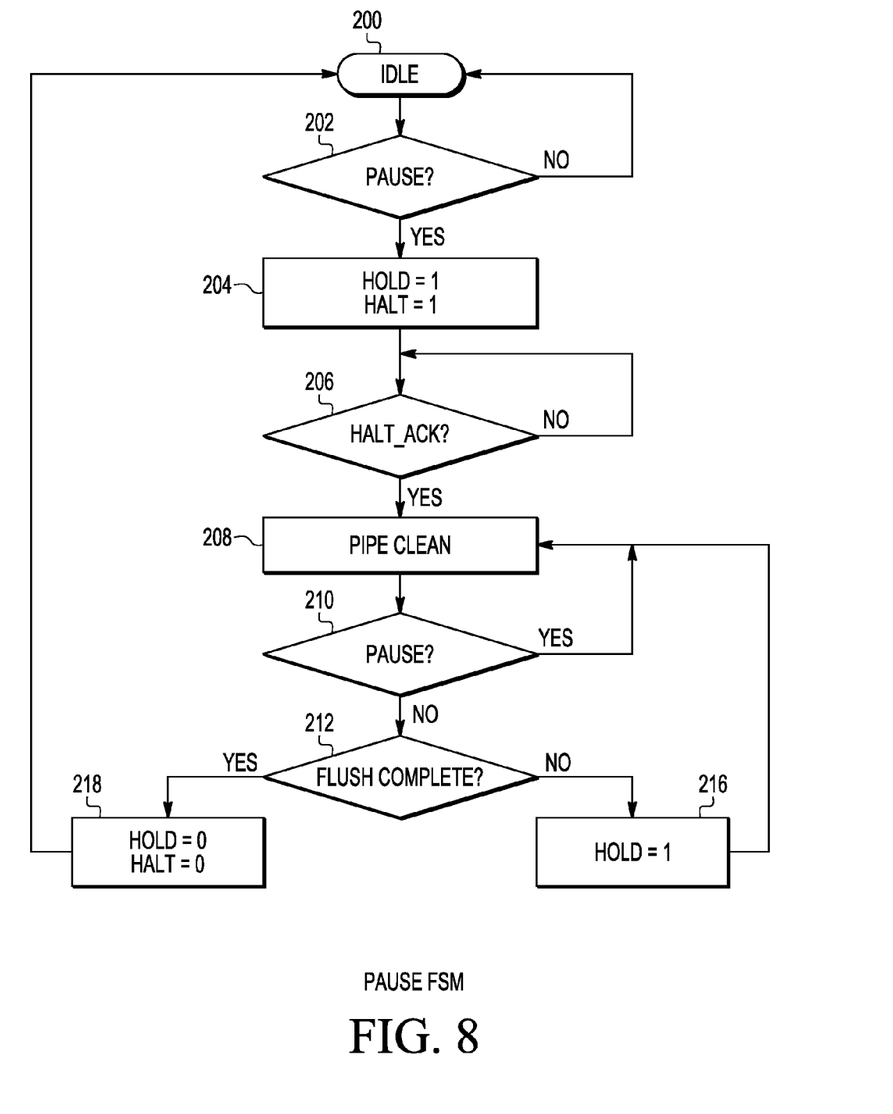
FIG. 8 is a flow diagram of the operation of the pause functional state machine (Pause FSM) flow 84 of FIG. 4.

In FIG. 8 there is shown the PAUSE FSM 70 flow. There is a PAUSE FSM 70 for each port/priority class. When the priority class is paused, the PAUSE FSM 70 is in an idle state 200. When a PAUSE indication 36 is asserted (at 202), a corresponding HOLD indication 38 is asserted toward the NTI 122 (at 204), and a HALT indication 40 is asserted toward the QMAN (at 204). (This was also shown in FIG. 4 at 84 for clarity.) The PAUSE FSM 70 now waits to receive the HALT_ACK indication 42 in response to the HALT indication 40 (at 206). The HALT_ACK indication serves as a "pipe-cleaner", indicating that no further FDs will be pushed by the QMAN 118 for the traffic class on hold. When the HALT_ACK indication is received, the QMAN 118 is in a "pipe-clean" state" (at 208). At this point, the QMI 114 is receiving any marked frames 57 (i.e. marked with FD_REC=1) from the recycle path 37 and storing those frames in priority queues 110 in external memory 32 (i.e. FIGS. 6, 102 to 108). If the QMI 114 senses the deassertion of the PAUSE indication 36 (at 210), it then checks to see if the FLUSH_COMPLETE indication 72 is asserted (at 212). If the FLUSH_COMPLETE indication 72 is deasserted, this indicates that the QMI memory controller 74 has not finished flushing a priority queue 110 from the external memory 32. Therefore, the HOLD indication 38 remains asserted (at 216) and PAUSE FSM 70 remains in pipe-clean state (at 208) until the PAUSE indication 36 is deasserted (at 210) and the FLUSH_COMPLETE indication 72 is asserted (at 212). At this point, the QMAN 118 pipe is clean, and external memory 32 queues are flushed. The HOLD indication 38 is deasserted, the HALT indication 40 is deasserted (at 218), and the FSM 70 returns to idle state.

In the embodiments described herein, the frames stored in external memory 32 are frame descriptors. It may be convenient to store other information along with the frame descriptors, such as certain metadata associated with the data frames. Other embodiments may store entire data frames. The systems and methods described herein for transmitting priority based flow controlled frames are advantageously employed in data center environments employing such technologies as Fibre Channel and Ethernet, and apply particularly well in 802.1Qbb PFC standards environments, though it is understood that the concepts described herein can be broadly applied in any environment where transmission of priority flow controlled traffic in a pipelined processor is desired.

A method of transmitting priority based flow controlled frames includes receiving a pause indication at a first stage at the head of a processing pipeline in a network processor. The network processor includes a plurality of stages including the first stage, a second stage coupled to the first stage, and a third stage coupled to the second stage and the first stage. The pause indication is received from the third stage. The pause indication is associated with one of a plurality of priority classes of frames advancing through the pipeline. The method includes asserting by the first stage a hold indication to the second stage in response to the receipt of the pause indication. The method also includes responding by the second stage to the hold indication by marking frames associated with the one of the plurality of priority classes as they arrive from the pipeline at the second stage and returning them to the first stage instead of transmitting them to the third stage. The method further includes storing the marked frames in memory external to the network processor. The method also includes asserting by the first stage a halt indication to a frame manager coupled to the first stage in response to receipt of the pause indication, the halt indication requesting that the frame manager halt sending of frames associated with the one of the plurality of priority classes to the first stage.

The method may further include receiving by the first stage a halt_ack indication from the queue manager indicating that the frame manager is no longer sending frames associated with the halt indication to the first stage.

The third stage may be a media access control (MAC) stage. The MAC receives and transmits frames to a network to which the MAC is coupled. In this case, the pause indication is sent from the MAC to the first stage in response to an 802.1Qbb pause frame received by the MAC from the network.

In this method, the frames are conveniently frame descriptors, though entire data frames are contemplated.

Storing the marked frames in external memory may include storing the marked frames in a priority class queue corresponding with the priority class associated with the pause indication. If so, the method can further include responding by the first stage to the deassertion of the pause indication by flushing the corresponding priority class queue in external memory to the pipeline. Then, if the pause indication has been reasserted during the flushing of the corresponding priority class queue, the method includes continuing to flush the priority class queue and assert the pause indication. Or, if the pause indication has not been reasserted and the flush of the priority class queue is complete, the method includes deasserting the pause indication and deasserting the halt indication.

An apparatus for transmitting priority based flow control frames includes a network processor configured to receive priority frames from a frame manager. The network processor includes several stages in a processing pipeline. The pipeline includes a first stage at a head of the processing pipeline, a second stage coupled to the first stage, and a third stage coupled to the second stage and the first stage. The third stage is configured to transmit a pause indication to the first stage. The pause indication is associated with one of a plurality of ports and priority classes of frames advancing through the pipeline.

The first stage is configured to request that the queue manager halt transmission of priority frames associated with the pause indication by asserting a halt indication to the frame manager in response to the pause indication. The first stage is also configured to assert a hold indication to the second stage in response to the pause indication.

The second stage is configured to respond to the hold indication by marking frames associated with the one of a plurality of priority classes as the frames arrive from the pipeline at the second stage and to return the marked frames to the first stage rather than transmit the marked frames to the third stage. The first stage is configured to receive marked frames from the third stage and store the marked frames in memory external to the network processor.

The apparatus may be further responsive to a halt_ack indication from the frame manager indicating that the frame manager is no longer sending frames associated with the pause indication to the first stage.

The third stage of the apparatus may be a media access control (MAC) stage, wherein the MAC is configured to receive and transmit frames to a network. In this case, the pause indication may be sent from the third stage to the first stage in response to receipt an 802.1Qbb pause frame from the network.

The frames are conveniently frame descriptors, though entire data frames are contemplated.

In the apparatus, the first stage may store the marked frames in the external memory in a priority class queue corresponding with the priority class associated with the pause indication.

The first stage may be responsive to the deassertion of the pause indication by flushing the corresponding priority class queue in external memory to the pipeline. The first stage may then be further responsive to the deassertion of the pause indication as follows: if the pause indication has been reasserted during the flushing of the priority class queue then continue to flush the priority class queue and assert the hold indication; otherwise, if the pause indication has not been reasserted and the flush of the priority class queue is complete then deassert the hold indication and deassert the halt indication.

A system for transmitting priority based flow control frames includes a frame manager coupled to a network processor and configured to transmit priority frames to the network processor.

The network processor includes a several of stages in a processing pipeline. The pipeline includes a first stage at a head of the processing pipeline, a second stage coupled to the first stage, and a third stage coupled to the second stage and the first stage. The third stage is configured to transmit a pause indication to the first stage. The pause indication is associated with one of a plurality of ports and priority classes of frames advancing through the pipeline.

The first stage is configured to request that the queue manager halt transmission of priority frames associated with the pause indication by asserting a halt indication to the frame manager in response to the pause indication. The first stage is also configured to assert a hold indication to the second stage.

The second stage is configured to respond to the hold indication by marking frames associated with one of a plurality of ports and priority classes as the frames arrive from the pipeline at the second stage and return the marked frames to the first stage rather than transmit the marked frames to the third stage. A memory external to the network processor is configured to store the marked frames.

In the system, the third stage may be a media access control (MAC) stage, wherein the MAC is configured to receive and transmit frames to a network, and wherein the pause indication is from sent from the MAC in response to an 802.1Qbb pause frame.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of transmitting priority based flow controlled frames comprising:

receiving a pause indication at a first stage at a head of a processing pipeline in a network processor, the network processor comprising a plurality of stages including the first stage, a second stage coupled to the first stage, and a third stage coupled to the second stage and the first stage, the pause indication received from the third stage, the pause indication associated with one of a plurality of priority classes of frames advancing through the pipeline;

asserting by the first stage a hold indication to the second stage in response to the receipt of the pause indication;

responding by the second stage to the hold indication by marking frames associated with the one of the plurality of priority classes as the frames arrive from the pipeline at the second stage and returning them to the first stage instead of transmitting them to the third stage;

storing the marked frames in memory external to the network processor; and asserting by the first stage a halt indication to a frame manager coupled to the first stage in response to receipt of the pause indication, the halt indication requesting that the frame manager halt sending of frames associated with the one of the plurality of priority classes to the first stage.

2. The method of claim 1 further comprising receiving by the first stage a halt_ack indication from the frame manager indicating that the frame manager is no longer sending frames associated with the halt indication to the first stage.

3. The method of claim 2 wherein the third stage is a media access control (MAC) stage, the MAC receiving and transmitting frames to a network to which the MAC is coupled.

4. The method of claim 3 wherein the pause indication is sent from the third stage to the first stage in response to an 802.1Qbb pause frame received by the MAC from the network.

5. The method of claim 1 wherein the frames are frame descriptors.

6. The method of claim 1 wherein storing the marked frames in external memory comprises storing the marked frames in a priority class queue corresponding with the priority class associated with the pause indication.

7. The method of claim 6 further comprising responding by the first stage to the deassertion of the pause indication by flushing the corresponding priority class queue in external memory to the pipeline.

8. The method of claim 7 further comprising continuing to flush the priority class queue and assert the pause indication if the pause indication has been reasserted during the flushing of the corresponding priority class queue.

9. The method of claim 7 further comprising deasserting the pause indication and deasserting the halt indication if the pause indication has not been reasserted and the flush of the priority class queue is complete.

10. An apparatus for transmitting priority based flow control frames comprising:

a network processor configured to receive priority frames from a frame manager, the network processor comprising a plurality of stages in a processing pipeline, the pipeline comprising a first stage at a head of the processing pipeline;

a second stage coupled to the first stage; and a third stage coupled to the second stage and the first stage, wherein the third stage is configured to transmit a pause indication to the first stage, the pause indication is associated with one of a plurality of priority classes of frames advancing through the pipeline, the first stage is configured to request that the frame manager halt transmission of one or more of the plurality of priority classes of frames associated with the pause indication by asserting a halt indication to the frame manager in response to the pause indication, the first stage is configured to assert a hold indication to the second stage in response to the pause indication, the second stage is configured to respond to the hold indication by marking frames associated with the one of a plurality of priority classes as the frames arrive from the pipeline at the second stage and return the marked frames to the first stage rather than transmit the marked frames to the third stage, and the first stage is configured to receive marked frames from the third stage and store the marked frames in memory external to the network processor.

11. The apparatus of claim 10 wherein the first stage is further responsive to a halt_ack indication from the frame manager indicating that the frame manager is no longer sending frames associated with the pause indication to the first stage.

12. The apparatus of claim 11 wherein the third stage is a media access control (MAC) stage, the MAC configured to receive and transmit frames to a network.

13. The apparatus of claim 12 wherein the pause indication is sent from the third stage to the first stage in response to receipt an 802.1Qbb pause frame from the network.

14. The apparatus of claim 10 wherein the frames are frame descriptors.

15. The apparatus of claim 10 wherein the first stage stores the marked frames in the external memory in a priority class queue corresponding with the priority class associated with the pause indication.

16. The apparatus of claim 15 wherein the first stage is responsive to the deassertion of the pause indication by flushing the corresponding priority class queue in external memory to the pipeline.

17. The apparatus of claim 16 wherein the first stage is further responsive to the deassertion of the pause indication by continuing to flush the priority class queue and assert the hold indication if the pause indication has been reasserted during the flushing of the priority class queue, then continuing to flush the priority class queue and assert the hold indication.

18. The apparatus of claim 16 wherein the first stage is further responsive to the deassertion of the pause indication by deasserting the hold indication and deassert the halt indication if the pause indication has not been reasserted and the flush of the priority class queue is complete.

19. A system for transmitting priority based flow control frames comprising:

a frame manager, coupled to a network processor, and configured to transmit priority frames to the network processor, the network processor comprising a plurality of stages in a processing pipeline, the pipeline comprising a first stage at a head of the processing pipeline;

a second stage coupled to the first stage; and a third stage coupled to the second stage and the first stage, wherein the third stage is configured to transmit a pause indication to the first stage, the pause indication is associated with one of a plurality of priority classes of frames advancing through the pipeline, the first stage is configured to request that the frame manager halt transmission of one or more of the plurality of priority classes of frames associated with the pause indication by asserting a halt indication to the frame manager in response to the pause indication, the first stage is configured to assert a hold indication to the second stage, the second stage is configured to respond to the hold indication by marking frames associated with one of a plurality of priority classes as the frames arrive from the pipeline at the second stage and returning the marked frames to the first stage rather than transmitting the marked frames to the third stage, and a memory external to the network processor configured to store the marked frames.

20. The system of claim 19 wherein the third stage is a media access control (MAC) stage, the MAC receiving and transmitting frames to a network, and wherein the pause indication is sent from the MAC in response to an 802.1Qbb pause frame.

* * * * *